(No Model.)
F. A. LA ROCHE.
STORAGE BATTERY.
No. 496,126.  Patented Apr. 25, 1893.
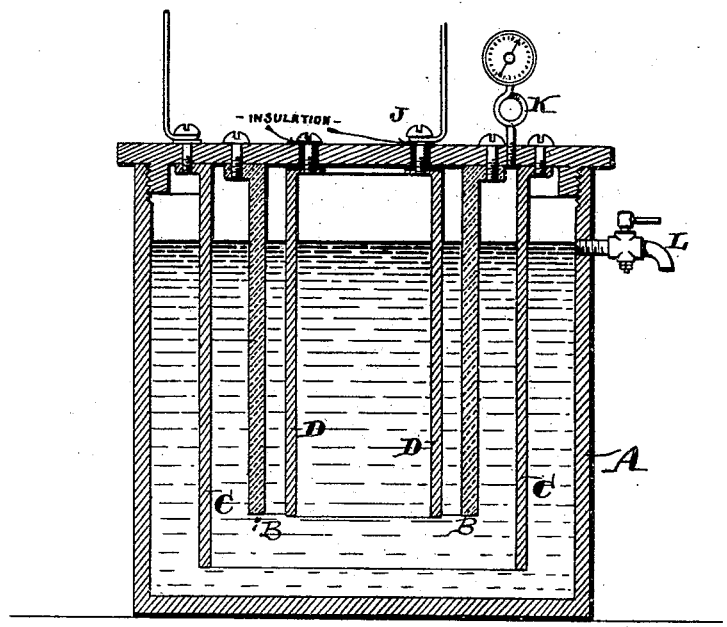
Witnesses:
Henry Drury
Edward Hosbach
Inventor:
Frederick A. La Roche
per Mark Wilks Collet
his attorney.

UNITED STATES PATENT OFFICE.

FREDERICK A. LA ROCHE, OF PHILADELPHIA, PENNSYLVANIA.

STORAGE-BATTERY.

SPECIFICATION forming part of Letters Patent No. 496,126, dated April 25, 1893.

Application filed March 25, 1892. Serial No. 426,443. (No model.)

*To all whom it may concern:*

Be it known that I, FREDERICK A. LA ROCHE, a citizen of the United States, residing in the city and county of Philadelphia and State of Pennsylvania, have invented a new and useful Improvement in Storage-Batteries, of which the following is a clear and sufficient specification, reference being had to the drawing annexed.

Among the objects of my invention, are to increase the electro-motive force of the single cell, of the storage battery, and to increase the percentage of return which it gives for the work performed upon it in charging. The normal electro-motive force which has been generated by a single cell hitherto has been about 1.7 volts rarely rising to two volts and the maximum return in available work of the work performed was about eighty-five per cent. This low electro-motive force and lack of efficiency of storage batteries hitherto, have hindered greatly the adoption of storage batteries, especially in locomotive structures where economy of space is a requisite. To increase the electro-motive force will enable a proportionately less number of cells to be used, and to increase the efficiency will diminish the cost of operating.

There are other objects of my invention set forth in the remaining portions of my specification.

My invention consists, essentially, in a device by which the gases which are evolved in charging the battery, are held, in part at least, at the poles at which they are evolved, and under pressure.

The figure is a sectional view of what I consider the best form of device embodying my invention.

I make the containing walls of the cell A of my battery, in my preferred form, sufficiently strong to sustain a heavy bursting pressure. A very convenient form of doing this is to construct them of iron or other sufficiently tenacious substance with a top cover screwed down to close the vessel. This top cover J may be removed to arrange the devices within the cell. I construct the plates C, D, forming the elements of the battery in any convenient manner and secure them in position in any way that is usual or desirable. The iron or other material forming the covering of the cell will of course be protected by some substance not affected by the battery fluid, if the substance of the cell would be affected thereby. By covering the battery the gases generated will be retained in the space between the fluid and the cover and as the volume of the gases generated increases, the pressure and condensation of the gases increase and some of the gases evolved are retained in the liquid instead of rising out of it. By this means a greater charge may be given to the battery and a greater percentage of return to be obtained. To collect, however, the gases arising from the decomposition of the battery fluid at the poles of the battery at which these gases are generated, so that each pole will have in electrical connection therewith the gas evolved at it and at it alone, I, in my preferred form of apparatus, separate the negative electrode from the positive by a partition, which allows of communication between the plates either through its porosity or around its edges below the level of the battery liquid. I prefer, however, to construct it in the form of a porous cylinder B, open at the bottom and made impervious where it projects above the liquid. This partition retains each gas separately and in communication with the electrode at which it was evolved. I can readily attach this cell to the lid of the cell so that it can be lifted on and off. The construction with the porous cylinder admits also, most readily, of graduating the size of the compartments to the amount of gas to be evolved. As is well known, water when broken up into hydrogen and oxygen, produces one volume of oxygen to two volumes of hydrogen, and the greater bulk of gas will therefore be collected about the negative pole. I place therefore, in practice, the negative electrode in the outside cell which is most conveniently, made of about double the capacity of the inner. In the inner cell, in practice, I place the positive electrode, about which the oxygen is collected. These gases are collected around elements of the same relation to each other as the gases (the more positive gas being collected about the more positive electrode and vice versa). By collecting the gases which are evolved at the poles and keeping them in electrical connection with the poles at which they are evolved and separating the gases from the poles at which they are not evolved, the work done in evolving them can be largely returned in the efficiency of the battery. More work can be done on a cell, and more of this work returned. By holding the gases under pressure, especially when under elastic pressure the gases will not rise so readily from the liquid and a greater amount of work can be done without the gases coming out of the liquid and therefore a greater amount of work can be done on the battery before it is "overcharged." By collecting the gases separately, and under pressure these two results are combined. Each cell has a greatly increased electro-motive force and a greater capacity when charged. It may be said with reference to this last, as the battery is discharged, the ordinary action of the storage battery takes place; in addition to this, an action of the gas, which forms, virtually, a gas battery, with the additional effects produced by the compression.

I do not, however, limit myself to a battery in which the gases evolved are separated from each other by a partition, or held in separate receptacles, as I can use advantageously a battery in which the plates on which the active matter is placed or formed are situated in the same compartment or receptacle and the gases retained under pressure. Neither, where a storage battery is used, without compression in which the gases evolved are accumulated in separate vessels in electric connection with the leads of the battery, will the device be outside my invention, since I claim that I am the first person, not only to maintain the gases evolved in charging storage batteries in electrical communication with the leads of the battery under elastic pressure but to utilize these gases at all to increase the efficiency of the storage battery, and that I am the first to utilize elastic pressure.

What I claim, therefore, and desire to secure by Letters Patent, is—

1. In a storage battery, a cell electrodes and battery liquid in combination with a receptacle, inclosing one of the electrodes above the battery liquid and having the portions below the liquid level porous and the portions above the level of the battery liquid impervious to the gases generated in the battery substantially as described.

2. In a storage battery, a cell electrodes and battery liquid in combination with an interior cell containing one of the electrodes, and inclosing it above the liquid and impervious to the gases generated in the battery at the parts above the liquid, substantially as described.

3. The combination with the battery liquid and plates of a storage battery of a containing cell hermetically sealed by a cover, a cover, a porous cylinder surrounding one of said plates, attached to the cover of said containing cell and means for securing the cover on the containing cell substantially as described.

4. In a storage battery, a cell hermetically inclosing the plates and fluid and separate receptacles in which the plates are placed inclosing said plates and gases generated around them, the plates and gases of one polarity being separated by the instrumentality of said receptacles from, the plates and gases of the other polarity substantially as described.

5. The combination of a hermetically sealed containing vessel, divided by a diaphragm, a plate chargeable positively in one of the compartments formed by said diaphragm a plate chargeable negatively in the other, leads electrically connected to said plates and a battery fluid substantially as described.

6. The combination in a storage battery in which the gases generated are retained under pressure and in electrical connection with the plate at which the same were generated; with the sealed containing vessel, a diaphragm dividing the vessel into parts corresponding approximately to the volumes of gases generated at the different poles of the battery substantially as described.

In witness whereof I have hereto set my hand in the presence of two subscribing witnesses.

FREDERICK A. LA ROCHE.

Witnesses:
MARK WILKS COLLET,
A. H. RICHARDSON.